United States Patent
Zhou

(10) Patent No.: US 12,517,225 B2
(45) Date of Patent: Jan. 6, 2026

(54) LASER TRANSCEIVING MODULE AND LIGHT ADJUSTMENT METHOD THEREOF, LiDAR, AND AUTOMATIC DRIVE APPARATUS

(71) Applicant: SUTENG INNOVATION TECHNOLOGY CO., LTD., Shenzhen (CN)

(72) Inventor: Yong Zhou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1101 days.

(21) Appl. No.: 17/516,789

(22) Filed: Nov. 2, 2021

(65) Prior Publication Data

US 2022/0057489 A1 Feb. 24, 2022

Related U.S. Application Data

(63) Continuation of application No. PCT/CN2020/070295, filed on Jan. 3, 2020.

(51) Int. Cl.
*G01S 7/481* (2006.01)
*G01S 7/484* (2006.01)
*G01S 17/08* (2006.01)
*G01S 17/931* (2020.01)

(52) U.S. Cl.
CPC ............ *G01S 7/4811* (2013.01); *G01S 7/484* (2013.01); *G01S 17/08* (2013.01); *G01S 17/931* (2020.01)

(58) Field of Classification Search
CPC ........ G01S 7/4811; G01S 7/484; G01S 17/08; G01S 17/931; G01S 7/4813; G01S 7/481
See application file for complete search history.

(56) References Cited

U.S. PATENT DOCUMENTS

| | | | | |
|---|---|---|---|---|
| 5,867,622 A | * | 2/1999 | Miyasaka | G02B 6/32 385/88 |
| 6,282,000 B1 | * | 8/2001 | Kikuchi | G02B 6/4246 398/139 |
| 6,334,716 B1 | * | 1/2002 | Ojima | H04B 10/40 398/139 |
| 10,003,168 B1 | * | 6/2018 | Villeneuve | G01S 7/4818 |
| 10,896,800 B2 | * | 1/2021 | Riedesel | H01J 37/09 |
| 2016/0245919 A1 | * | 8/2016 | Kalscheur | G01S 7/4817 |

(Continued)

FOREIGN PATENT DOCUMENTS

| | | | | |
|---|---|---|---|---|
| CN | 108139555 A | | 6/2018 | |
| CN | 108594206 A | * | 9/2018 | ........... G01S 17/931 |

(Continued)

OTHER PUBLICATIONS

CN 108594206 A English (Year: 2018).*

(Continued)

*Primary Examiner* — Victoria Murphy
*Assistant Examiner* — Jempson Noel
(74) *Attorney, Agent, or Firm* — BAYES PLLC

(57) ABSTRACT

Embodiments of a laser transceiving module, a light adjustment method, a LiDAR, and an automatic drive apparatus are disclosed. The laser transceiving module includes a base, a side cover, a laser emitting module, an emitting optical system, a laser splitting module, a receiving optical system, and a laser receiving module.

15 Claims, 10 Drawing Sheets

(56) References Cited

U.S. PATENT DOCUMENTS

2017/0350965 A1* 12/2017 Schmalenberg ...... G01S 7/4817
2019/0041515 A1*  2/2019 Haruguchi ............ G01S 7/4817
2019/0103919 A1   4/2019 Hailai et al.

FOREIGN PATENT DOCUMENTS

CN    110376597 A    10/2019
EP       0892293 A1    1/1999

OTHER PUBLICATIONS

International Search Report issued in corresponding international application No. PCT/CN2020/070295, dated Oct. 13, 2020, 5 pages.

* cited by examiner

LASER TRANSCEIVING MODULE AND LIGHT ADJUSTMENT METHOD THEREOF, LiDAR, AND AUTOMATIC DRIVE APPARATUS

CROSS-REFERENCE TO RELATED APPLICATION

The present application is a bypass continuation of PCT/CN2020/070295 with an international filing date of Jan. 3, 2020, the entirety of which is hereby incorporated herein by reference.

TECHNICAL FIELD

The present disclosure relates to the technical field of a radar, and more particularly to a laser transceiving module and a light adjustment method thereof, LiDAR, and an automatic drive apparatus.

BACKGROUND

LiDAR is a radar system that uses laser to detect the position and speed of a target object. The LiDAR generally includes a laser transceiving module having an emitting module and a receiving module. The working principle of the LiDAR is that the emitting module first emits an emergent laser for detection of a target, and then the receiving module receives an echo laser reflected from the target object and processes the received echo laser to obtain relevant information about the target object, for example, parameters such as distance, azimuth, height, speed, attitude, and even shape.

The laser transceiving module in the conventional skills includes many components. After each component is assembled, it is necessary to perform complex light adjustment, and then determine the position of each component. Since an optical path of each component affects each other, the adjustment of the optical path is more complicated and adjustment time is longer. In addition, in order to fix the positions of various components, a fixing structure occupies a relatively large volume, resulting in a relatively large volume of the entire transceiving module.

SUMMARY

In view of the foregoing shortcomings of the conventional skills, a main objective of an embodiment of the present disclosure is to provide a laser transceiving module and a light adjustment method thereof, a LiDAR, and an automatic drive apparatus, thereby realizing the modular design of the laser transceiving module, making light adjustment relatively simple, and greatly compressing a volume.

One technical solution of an embodiment of the present disclosure is to provide a laser transceiving module that may include a base, a side cover, a laser emitting module, an emitting optical system, a laser splitting module, a receiving optical system, and a laser receiving module.

The base may include a base body. The base body and the side cover may encircle to form a cavity. The emitting optical system, the laser splitting module, and the receiving optical system may be arranged in the cavity. An emitting channel, a laser splitting channel, and a receiving channel for mounting the emitting optical system, the laser splitting module, and the receiving optical system respectively may be arranged in the cavity.

The laser emitting module and the laser receiving module are arranged on the base and positioned outside the cavity.

The laser emitting module is configured to emit an emergent laser. The emitting optical system is configured to collimate the emergent laser. The laser splitting module is configured to enable the collimated emergent laser to pass through the laser splitting module and emit to a detection area, and enable an echo laser incident coaxially with the emergent laser to be deflected and direct to the receiving optical system. The receiving optical system is configured to converge the echo laser, and enable the converged echo laser to direct to the laser receiving module. The laser receiving module is configured to receive the echo laser.

In some embodiments, a first mounting frame, a second mounting frame, and a third mounting frame may be arranged in the cavity. The emitting channel may be arranged in the first mounting frame. The receiving channel may be arranged in the second mounting frame. The laser splitting channel may be arranged in the third mounting frame. The laser splitting channel may include a first optical port, a second optical port, and a third optical port. The first optical port may be aligned with a light outlet of the emitting channel. The third optical port may be aligned with a light inlet of the receiving channel.

In some embodiments, the first mounting frame may include a one-piece mounting frame. The second mounting frame may include a one-piece mounting frame or a split-type mounting frame.

In some embodiments, the first mounting frame may include a first top plate and a first bottom plate. The emitting channel may be formed between the first top plate and the first bottom plate.

In some embodiments, the emitting optical system may include a fast-axis collimating module a slow-axis collimating module, and a plurality of emitting lenses. The emitting channel may include a plurality of emitting lens positions for mounting the emitting lenses. A limit block may be arranged between adjacent ones of the plurality of emitting lens positions. The limit block is arranged inside the emitting channel and positioned at upper and lower sides of the emitting channel.

In some embodiments, a bottom of the first bottom plate is opened and provided with a weight reduction groove.

In some embodiments, at least a first emitting diaphragm and a second emitting diaphragm are arranged in the emitting channel.

The first emitting diaphragm may include at least one first emitting sub-diaphragm arranged between the fast-axis collimating module and the slow-axis collimating module in sequence. Each of the at least one first emitting sub-diaphragm may include a light blocking part correspondingly arranged on a lower side of the first top plate and an upper side of the first bottom plate.

The second emitting diaphragm may be arranged between the slow-axis collimating module and the laser splitting module. The second emitting diaphragm is provided with a circular first light-passing hole.

In some embodiments, the second mounting frame may include at least one second top plate and at least one second bottom plate corresponding to the at least one second top plate. The receiving channel may be formed between at least one pair of the second top plate and the second bottom plate.

In some embodiments, the receiving optical system may include a focusing module and a correcting module and may include a plurality of receiving lenses. The receiving channel may include a plurality of receiving lens positions for mounting the receiving lens. The limit block may be arranged between adjacent ones of the plurality of receiving lens positions. The limit block is arranged on the upper and lower sides of the receiving channel.

In some embodiments, at least a first receiving diaphragm and a second receiving diaphragm may be arranged in the receiving channel.

The first receiving diaphragm may be arranged between the focusing module and the correcting module. The first receiving diaphragm may be provided with a circular second light-passing hole.

The second receiving diaphragm may be arranged between the correcting module and the laser receiving module. The second receiving diaphragm may be provided with a circular third light-passing hole.

In some embodiments, each of the third mounting frame and the first mounting frame may include a one-piece structure.

In some embodiments, a mirror module may be further arranged in the cavity. The mirror module is configured to reflect the echo laser deflected by the laser splitting module and shoot the echo laser toward the receiving optical system. A fourth mounting frame may be arranged in the cavity. A reflecting channel may be arranged in the fourth mounting frame. The mirror module may be mounted in the reflecting channel. A light inlet of the reflecting channel may be aligned with the third optical port of the laser splitting channel. A light outlet of the reflecting channel may be aligned with the light inlet of the receiving channel.

In some embodiments, each of the fourth mounting frame, the second mounting frame, and the third mounting frame may include a one-piece structure.

In some embodiments, the base may further include a fixing plate extending from one side of the base body. The laser emitting module may be arranged on the fixing plate. The laser receiving module may be arranged on an outer side wall of the base body.

In some embodiments, the emitting optical system, the laser splitting module, and the receiving optical system may be fixed in the emitting channel, the laser splitting channel, and the receiving channel via an adhesive, respectively.

An embodiment of the present disclosure may further provide a LiDAR, including at least one foregoing laser transceiving module.

An embodiment of the present disclosure may further provide an automatic drive apparatus, including a drive apparatus body and a LiDAR as described above. The LiDAR may be mounted at the drive apparatus body.

An embodiment of the present disclosure may further provide a method for emitting light adjustment of a laser transceiving module as described above, including the following steps: fixing an emitting optical system, a laser splitting module, and a receiving optical system in an emitting channel, a laser splitting channel, and a receiving channel respectively to obtain a pre-mounted module; fixing the pre-mounted module on an emitting light adjustment platform and aligning the pre-mounted module with a parallel light plate; positioning a laser emitting module in an area of a base for fixing the laser emitting module; clamping the laser emitting module with a tooling clamp, a laser emitting port of the laser emitting being aligned with a light-entering hole of the base; adjusting the laser emitting module along an X-axis direction, a Y-axis direction, and a Z-axis direction via a 3D adjustment frame until a light spot on the parallel light plate meets preset requirements; and fixing the laser emitting module to on the base.

An embodiment of the present disclosure further provides a receiving light adjustment method of a laser transceiving module as described above, including the following steps: fixing a base adjusted by an emitting light on a receiving light adjustment platform, where a laser emitting module, an emitting optical system, a laser splitting module, and a receiving optical system are fixed on a base; clamping a laser receiving module with a tooling clamp so that the laser receiving module contacts a light-emitting hole of the base; adjusting the laser receiving module in an X-axis direction and a Y-axis direction via a 3D adjustment frame until echo laser signals meet preset requirements; and fixing the laser receiving module on the base.

An embodiment of the present disclosure has the following beneficial effects: different from the conventional skills, the embodiment of the present disclosure provides the LiDAR. The emitting optical system, the laser splitting module, and the receiving optical system are arranged in the cavity via the arrangement of the separate cavity. The laser emitting module and the laser receiving module are arranged on the base outside the cavity. The emitting channel, the laser splitting channel, and the receiving channel for fixing the emitting optical system, the laser splitting module, and the receiving optical system respectively are arranged in the cavity. Since the emitting optical system, the laser splitting module and the receiving optical system are directly embedded in the respective channels thereof, other fixing devices and fasteners are not needed to fix the emitting optical system, the laser splitting module and the receiving optical system, thereby reducing the number of parts, saving costs, having a simpler assembly process, shortening assembly time, improving assembly efficiency, being also beneficial to reduce the height and width of the laser transceiving module, and reducing the volume and weight of the single laser transceiving module. The emitting optical system, the laser splitting module, and the receiving optical system in the cavity may be used as a whole to perform light adjustment with the laser emitting module and the laser receiving module. Fewer parts for the light adjustment are provided, thereby reducing the complexity of optical path adjustment, shortening adjustment time, and reducing assembly complexity. The adjusted laser transceiving module has a modular structure and may be combined with other laser transceiving modules to form multi-channel transceiving to meet the requirements of a large field of view and high resolution. Laser optical paths of each laser transceiving module are separated to avoid mutual influence. When the single laser transceiving module fails, the failing module may be directly replaced, which is convenient for repair and replacement, has strong interchangeability, and is easy to mass produce.

BRIEF DESCRIPTION OF THE DRAWINGS

One or more embodiments are described by using examples with reference to diagrams in drawings corresponding to the embodiments. These example descriptions do not constitute a limitation to the embodiments. Elements with the same reference signs in the drawings may indicate similar elements. Unless otherwise stated, the diagrams in the drawings do not constitute a proportional limitation.

Figure 1:
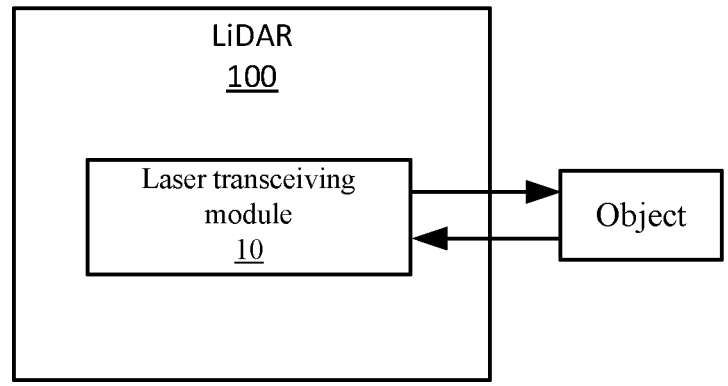
FIG. 1 shows a structural block diagram of a LiDAR provided by an embodiment of the present disclosure.

Reference signs in the embodiments are as follows:

100: LiDAR, 10: Laser Transceiving Module, 1: Base, 11: Base Body, 12: Fixing Plate, 13: Mounting Plate, 131: Mounting Hole, 132: Limit Baffle, 14: Light-Entering Hole, 15: Light-Emitting Hole, 2: Side Cover, 3: Laser Emitting Module, 31: Emitting Plate, 32: Heat Sink, 4: Emitting Optical System, 41: Fast-Axis Collimating Module, 411: First Fast-Axis Collimating Lens, 412: Second Fast-Axis Collimating Lens, 413: Third Fast-Axis Collimating Lens, 42: Slow-Axis Collimating Module, 5: Laser Splitting Module, 6: Receiving Optical System, 61: Focusing Module, 62: Correcting Module, 7: Laser Receiving Module, 8: Mirror Module, 9: Cavity, 91: Emitting Channel, 92: Laser Splitting Channel, 93: Receiving Channel, 94: Reflecting Channel, 95: Limit Block, 9611: First Emitting Diaphragm, 9612: Second Emitting Diaphragm, 9621: First Receiving Diaphragm, Second Receiving Diaphragm, 963: Optical Filter, 971: First Mounting Frame, 9711: First Top Plate, 9712: First Bottom Plate, 9713: Weight Reduction Groove, 972: Second Mounting Frame, 9721: Second Top Plate, 9722: Second Bottom Plate, 973: Third Mounting Frame, 974: Fourth Mounting Frame, 300: Emitting Light Adjustment Platform, 301: Parallel Light Plate, 302: Tooling Clamp, 303: 3D Adjustment Frame, 400: Receiving Light Adjustment Platform, 200: Automatic Driving Apparatus, 201: Driving Apparatus Body.

DETAILED DESCRIPTION

Embodiments of the technical solution of the present disclosure are described in detail below in conjunction with the drawings. The following embodiments are only used to describe the technical solutions of the present disclosure more clearly, and thus they are only used as examples and cannot be used to limit the protection scope of the present disclosure.

It should be noted that unless otherwise specified, the technical or scientific terms used in the present disclosure should have general meanings understood by a person of ordinary skill in the art to which the present disclosure belongs.

In the description of the present disclosure, it should be understood that orientations or position relationships indicated by terms such as "center", "longitudinal", "lateral", "length", "width", "thickness", "above", "under", "front", "rear", "left", "right", "vertical", "horizontal", "top", "bottom", "inner", "outer", "clockwise", "counterclockwise", "axial", "radial", and "circumferential" are based on the orientations or position relationships shown in the drawings, are merely intended to describe the present disclosure and simplify the descriptions, but are not intended to indicate or imply that the indicated device or element shall have a specific orientation or be formed and operated in a specific orientation, and therefore cannot be understood as a limitation to the present disclosure.

In addition, the terms such as "first" and "second are merely intended for a purpose of description, and shall not be understood as an indication or implication of relative importance or implicit indication of a quantity of indicated technical features. In the description of the present disclosure, "a plurality of" means two or more, unless otherwise specifically defined.

In the present disclosure, unless otherwise clearly specified and limited, terms such as "mounting", "connected", "connection", and "fixing" shall be understood in a general sense. For example, these technical terms may be a fixed connection, a detachable connection, or an integrated connection; or may be a mechanical connection or an electrical connection; or may be a direct connection, an indirect connection by using an intermediate medium, or an internal communication of two elements or an interaction of two elements. A person of ordinary skill in the art may understand specific meanings of the foregoing terms in the present disclosure according to a specific situation.

In the present disclosure, unless otherwise clearly specified and defined, that a first feature is "above" or "under" a second feature may be that the first feature and the second feature are in direct contact, or the first feature and the second feature are in indirect contact through an intermediate medium. Moreover, that a first feature is "above", "over", and "on" a second feature may be that the first feature is right above or not right above the second feature, or may merely indicate that a horizontal height of the first feature is greater than that of the second feature, that a first feature is "below", "underneath", and "under" a second feature may be that the first feature is right below or not right below the second feature, or may merely indicate that a horizontal height of the first feature is less than that of the second feature.

As shown in FIG. 1, an embodiment of the present disclosure provides a LiDAR 100, including a laser transceiving module 10. The laser transceiving module 10 may be configured to emit an emergent laser and receive an echo laser. The echoed laser is a laser returned after the emergent laser is reflected by an object in a detection area.

Figure 2:
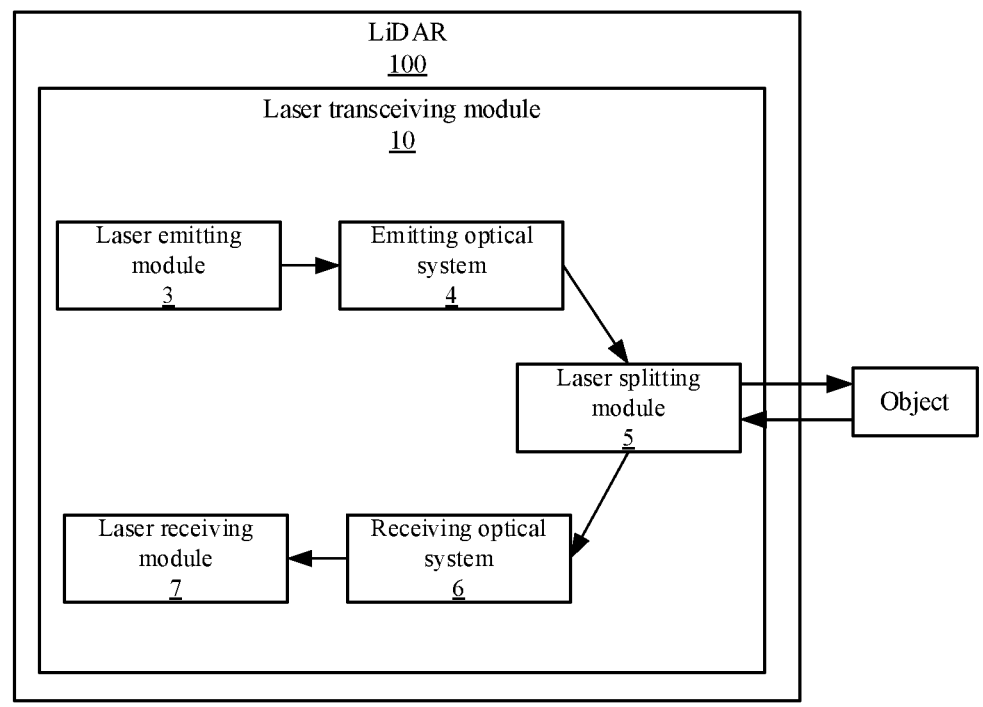
FIG. 2 shows a structural block diagram of a LiDAR provided by another embodiment of the present disclosure.

As shown in FIG. 2, the laser transceiving module 10 may include a laser emitting module 3, an emitting optical system 4, a laser splitting module 5, a receiving optical system 6, and a laser receiving module 7. The laser emitting module 3 may be configured to emit the emergent laser. The emitting optical system 4 may be configured to collimate the emergent laser. The laser splitting module 5 may be configured to make the collimated emergent laser pass through the laser splitting module 5 and then emit to a detection area, and make an echo laser incident coaxially with the emergent laser be deflected and direct to the receiving optical system 6. The receiving optical system 6 may be configured to converge the echo laser and make the converged echo laser direct to the laser receiving module 7. The laser receiving module 7 may be configured to receive the echo laser.

Figure 3:
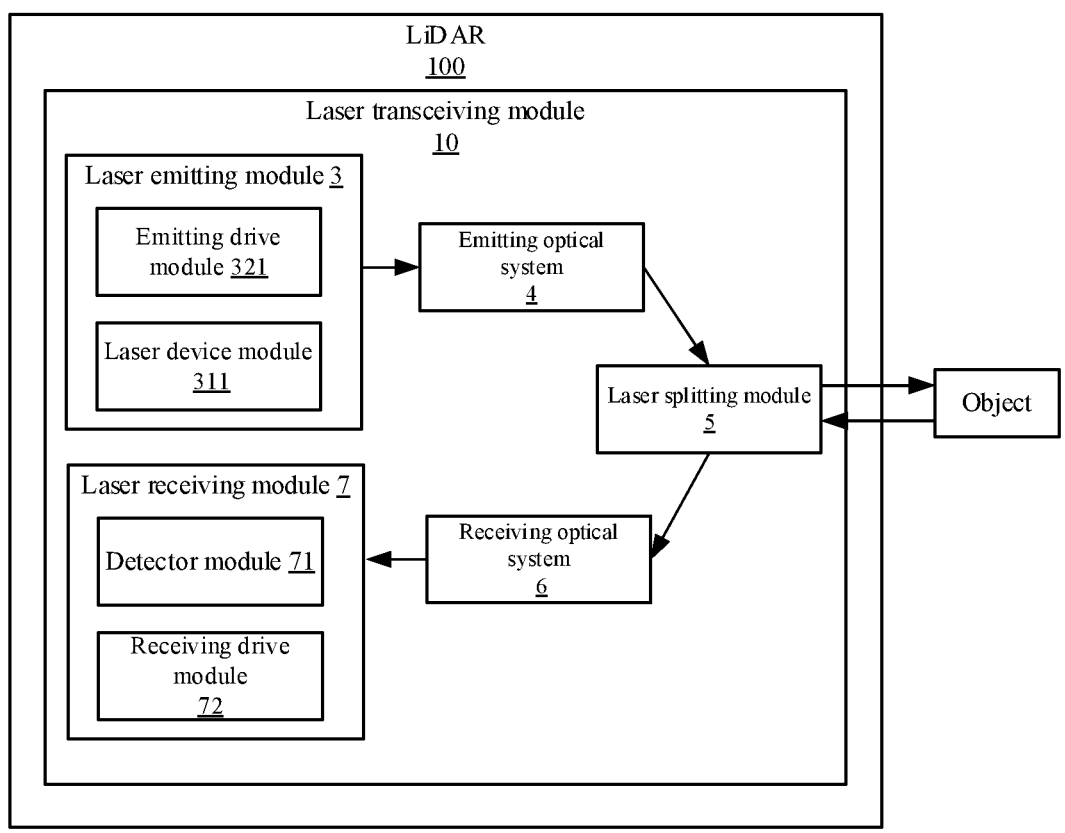
FIG. 3 shows a structural block diagram of a LiDAR provided by still another embodiment of the present disclosure.

As shown in FIG. 3, the laser emitting module 3 may include a laser device module 311 and an emitting drive module 321. The laser device module 311 may be configured to emit the emergent laser, and the emitting drive module 321 may be connected to the laser device module for driving and controlling the operation of the laser device module. The laser receiving module 7 may include a detector module 71 and a receiving drive module 72. The detector module 71 may be configured to receive an echo laser converged by the receiving optical system 6. The receiving drive module 72 may be connected to the detector module 71 for driving and controlling the operation of the detector module 71.

In addition, the LiDAR 100 may also include a control and signal processing module, such as a Field Programmable Gate Array (FPGA) (not shown). The FPGA may be connected to the emitting drive module for emitting and controlling the emergent laser. The FPGA may be also connected to a clock pin, a data pin, and a control pin of the laser receiving module 7 for receiving and controlling the echo laser.

The laser emitting module 3 may include various types of signal light sources, such as a laser diode (LD), a vertical cavity surface emitting laser (VCSEL), a light emitting diode (LED) fiber and/or other devices. The emitting optical system 4 may use one or more combinations of an optical fiber, a ball lens group, a separate ball lens group, a cylindrical lens group, and the like. The laser splitting module 5 may include a central circular hole mirror, a polarization beam splitter, a polarization beam splitter flat sheet, a combined beam splitter (a polarization beam splitter flat sheet is arranged at an central opening of the mirror), and the like. The receiving optical system 6 may use one or more combinations of the ball lens, the ball lens group, or the cylindrical lens group. The laser receiving module 7 may use an Avalanche Photo Diode (APD), a Silicon Photomultiplier (SiPM), APD, a Multi-Pixel Photon Counter (MPPC), a Photomultiplier Tube (PMT), a Single-Photon Avalanche Diode (SPAD), a Fast Charge-Coupled Device (CCD), and a Complementary Metal Oxide Semiconductor (CMOS) receiving device.

The structure of the laser transceiving module 10 is further described below.

Figure 4:
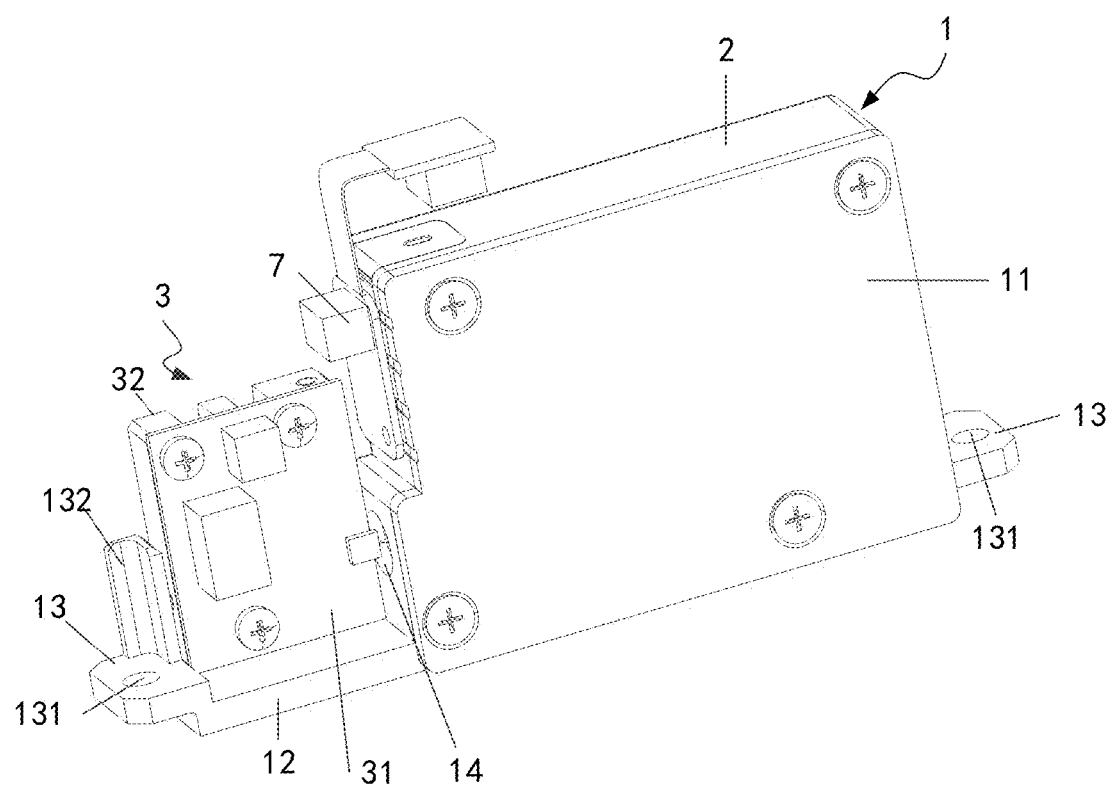
FIG. 4 shows a perspective view of a laser transceiving module provided by an embodiment of the present disclosure.
Figure 5:
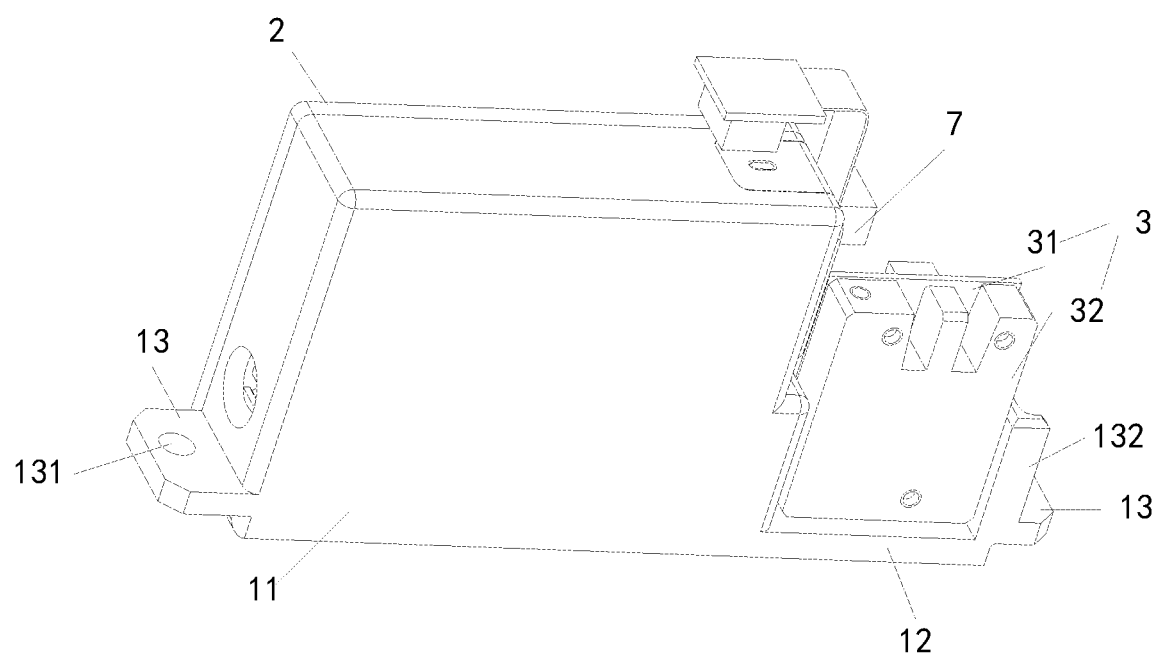
FIG. 5 shows another perspective view of the laser transceiving module provided by an embodiment of the present disclosure.
Figure 6:
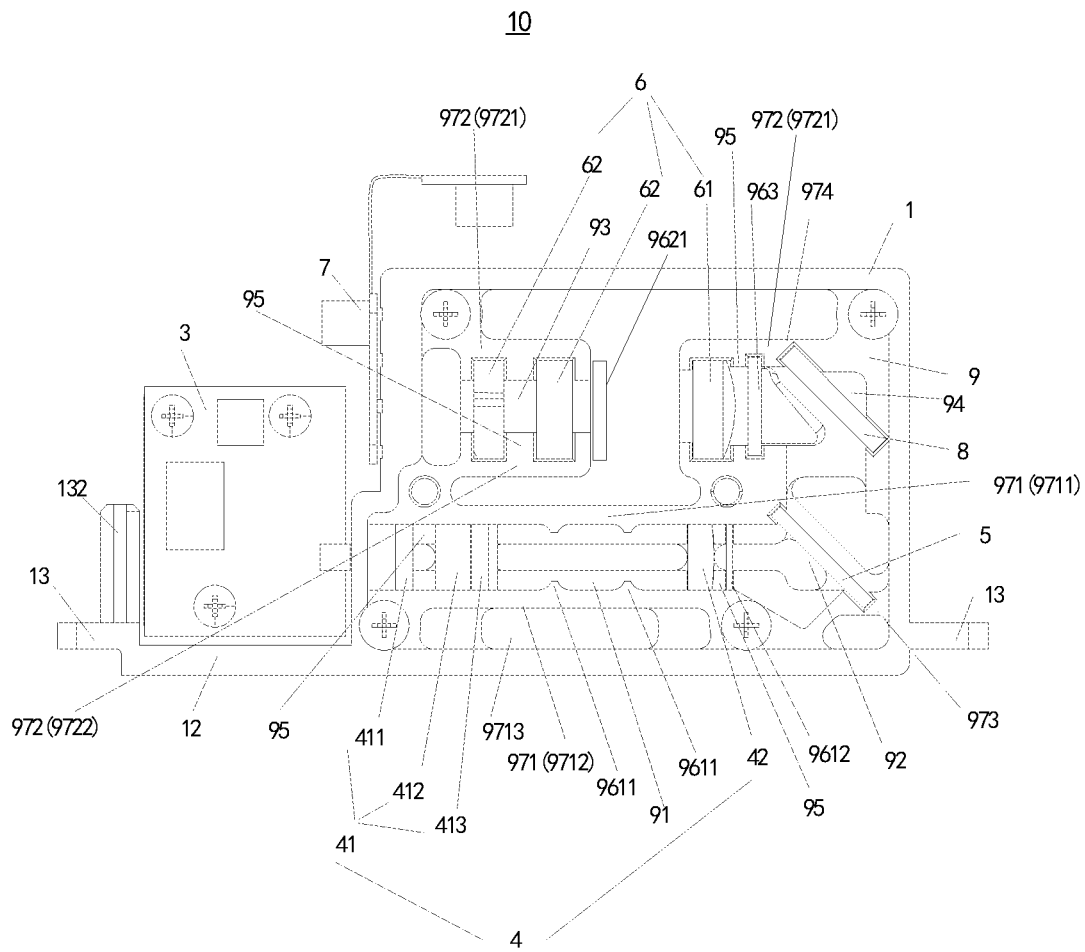
FIG. 6 shows a front view of a laser transceiving module provided by an embodiment of the present disclosure after a side cover is opened.

As shown in FIGS. 4-7, the laser transceiving module 10 may include a base 1, a side cover 2, the laser emitting module 3, the emitting optical system 4, the laser splitting module 5, the receiving optical system 6, and the laser receiving module 7. As shown in FIG. 4, the base 1 may include a base body 11. The laser emitting module 3 and the laser receiving module 7 may be arranged on the base 1 and positioned outside the cavity 9. The base body 11 may be opened and provided with a light-entering hole 14 that penetrates the side wall of the base body 11 at a place where the base body 11 is aligned with the laser emitting module 3. A mounting plate 13 may be arranged on the base 1. The mounting plate 13 may be opened and provided with a mounting hole 131. A threaded connector (such as a screw or a bolt, etc.) may pass through the mounting hole 131 to fix the base 1 to a corresponding position in the LiDAR 100. As shown in FIG. 6, the base body 11 and the side cover 2 encircle to form a cavity 9. The emitting optical system 4, the laser splitting module 5, and the receiving optical system 6 may be arranged in the cavity 9. The emitting channel 91, the laser splitting channel 92 and the receiving channel 93 for mounting the emitting optical system 4, the laser splitting module 5, and the receiving optical system 6 may be arranged in the cavity 9.

In this embodiment, an emitting optical path and a receiving optical path may be coaxially arranged.

As shown in FIG. 5, the base body 11 may have a square frame structure with an opening at one side thereof, and the side cover 2 may cover the opening. The base 1 may further include a fixing plate 12 extending from one side of the base body 11. The laser emitting module 3 may be arranged on the fixing plate 12. The laser receiving module 7 may be arranged on the outer side wall of the base body 11.

Figure 8:
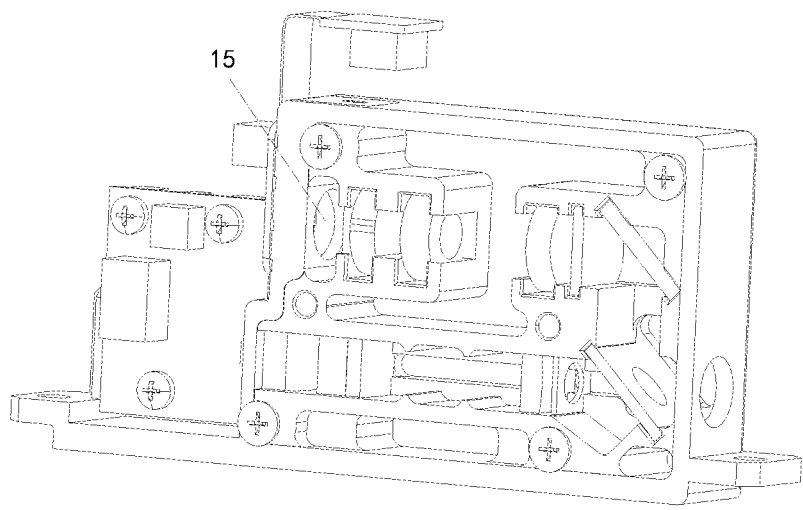
FIG. 8 shows another perspective view of a laser transceiving module provided by an embodiment of the present disclosure after a side cover is opened.

The emergent laser emitted by the laser emitting module 3 may enter the emitting optical system 4 in the cavity 9 through the light-entering hole 14. The base body 11 may be opened and provided with a light-emitting hole 15 (as shown in, e.g., FIG. 8) that penetrates the side wall of the base body 11 at a place where the base body 11 is aligned with the laser receiving module 7. The echo laser converged by the receiving optical system 6 in the cavity 9 enters the laser receiving module 7 via the light-emitting hole 15.

As shown in FIG. 4, a mounting plate 13 may be arranged on the base 1. The mounting plate 13 may be opened and provided with a mounting hole 131. A threaded connector (such as a screw or a bolt, etc.) may passe through the mounting hole 131 to fix the base 1 to a corresponding position in the LiDAR 100. In this embodiment, as shown in FIG. 5, mounting plates 13 may be arranged. A first mounting plate 13 may extend from a bottom of the side wall at one end of the base body 11 where the laser splitting module 5 is mounted, and a second mounting plate 13 may extend from one end of the fixing plate 12. A limit baffle 132 may be also arranged on the second mounting plate 13. The laser emitting module 3 may be positioned between the limit baffle 132 and the outer side wall of the base body 11.

The shape of the side cover 2 may match the shape of the opening of the base 1, and generally a square cover plate may be used. The side cover 2 may be fixed to the base body 11 by a fastener such as the screw or the bolt.

As shown in FIG. 4 and FIG. 5, the laser emitting module 3 may include an emitting plate 31 and a heat sink 32 mounted on the emitting plate 31. The emitting plate 31 may include a printed circuit plate (PCB) (not shown), and a plurality of electronic devices may be arranged on the PCB. The emitting plate 31 may be configured to emit the emergent laser. In this embodiment, the laser emitting module 3 may stand aside and may be arranged on the fixing plate 12, and the plate surface of the PCB may be approximately perpendicular to the fixing plate 12. By arranging the laser emitting module 3 to stand aside, the PCB may be not attached to the fixing plate 12 in a large area, which is beneficial to the heat dissipation of the emitting plate 31.

Figure 7:
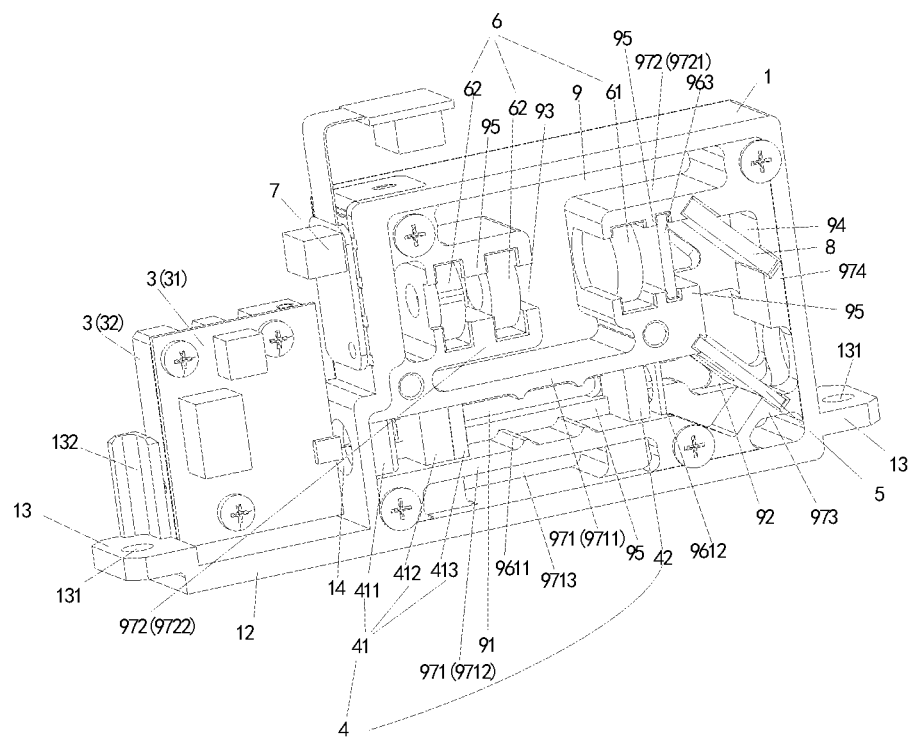
FIG. 7 shows a perspective view of a laser transceiving module provided by an embodiment of the present disclosure after a side cover is opened.

As shown in FIGS. 6 and 7, a first mounting frame 971, a second mounting frame 972, and a third mounting frame 973 may be arranged in the cavity 9. The emitting channel 91 may be arranged in the first mounting frame 971. The receiving channel 93 may be arranged in the second mounting frame 972. The laser splitting channel 92 may be arranged in the third mounting frame 973. The emitting optical system 4, the laser splitting module 5, and the receiving optical system 6 may be embedded into the emitting channel 91, the laser splitting channel 92, and the receiving channel 93, respectively. Considering that the emitting optical system 4, the laser splitting module 5 and the receiving optical system 6 may be directly embedded in the respective channels thereof, other fixing devices and fasteners may be not needed to fix the emitting optical system, the laser splitting module and the receiving optical system, thereby reducing the number of parts, saving costs, having a simpler assembly process, shortening assembly time, improving assembly efficiency, being also beneficial to reduce the height and width of the laser transceiving module 10, and reducing the volume and weight of the single laser transceiving module 10.

In some embodiments, the emitting optical system 4, the laser splitting module 5, and the receiving optical system 6 may be fixed in the respective channels thereof via an adhesive.

The emitting channel 91 may receive the emergent laser through the light-entering hole 14 on the base 1. The emitting channel 91 may further include a light outlet (now shown) through which the emergent laser enters the laser splitting channel 92. The receiving channel 93 may include a light inlet (not shown) through which the echo laser passing through the laser splitting channel 92 enters the receiving channel 93, and then enters the laser receiving module 7 via the light outlet 15. The laser splitting channel 92 may include a first optical port, a second optical port, and a third optical port. The first optical port may be aligned with the light outlet of the emitting channel 91. The third optical port may be aligned with the light inlet of the receiving channel 93. The second optical port may face a detection area.

The first mounting frame 971 may include a one-piece mounting frame. The first mounting frame 971 may include a first top plate 9711 and a first bottom plate 9712. The emitting channel 91 may be formed between the first top plate 9711 and the first bottom plate 9712. The bottom of the first bottom plate 9712 may be opened and provided with a weight reduction groove 9713. The weight reduction groove 9713 may be configured to reduce the weight of a product by removing part of the raw materials, to meet the requirement of a light-weight product.

The emitting optical system 4 may include a plurality of emitting lenses. The emitting channel 91 may include a plurality of emitting lens positions for mounting the emitting lenses. A limit block 95 may be arranged between the adjacent emitting lens positions. The limit block 95 may be arranged inside the emitting channel 91 and positioned at the upper and lower sides of the emitting channel 91. Considering that the arrangement of two limit blocks 95 on the upper and lower sides, the emitting lens mounted in the emitting lens position may be accurately limited. The limit block 95 may be arranged on the inner side of the emitting channel 91 to prevent the limit block 95 from shielding the emergent laser propagating in the emitting channel 91.

A plurality of emitting lenses of the emitting optical system 4 may include a fast-axis collimating module 41 and a slow-axis collimating module 42. The fast-axis collimating module 41 may include a first fast-axis collimating lens 411, a second fast-axis collimating lens 412, and a third fast-axis collimating lens 413. The slow-axis collimating module 42 may include a slow-axis collimating lens. At least a first emitting diaphragm 9611 and a second emitting diaphragm 9612 may be arranged in the emitting channel 91, which may reduce or eliminate stray light on the emitting optical path.

The first emitting diaphragm 9611 may include at least one first emitting sub-diaphragm arranged between the fast-axis collimating module 41 and the slow-axis collimating module 42 in sequence. Each first emitting sub-diaphragm may include a light blocking part correspondingly arranged on the lower side of the first top plate 9711 and the upper side of the first bottom plate 9712. In this embodiment, two first emitting sub-diaphragms may be arranged. Owing to the arrangement of two first emitting sub-diaphragms, more than 95% of the stray light may be eliminated. If only one first emitting sub-diaphragm is arranged, the elimination of stray light may not be able to meet the actual demand. Therefore, in consider of costs and effects, two first emitting sub-diaphragms may be arranged. In this embodiment, as shown in FIG. 7, the structure of the first emitting sub-diaphragm may be elongated protrusions arranged on the upper and lower sides of the emitting channel 91, and an arc-shaped transition may be formed between the protrusions and the sidewall of the channel. Since the emergent laser collimated by the fast axis is reflected back and forth on the side wall in the emitting channel 91. The reflected light outside the optical path propagated by the emergent laser may be blocked by the elongated protrusions.

The second emitting diaphragm 9612 may be arranged between the slow-axis collimating module 42 and the laser splitting module 5. Considering that the light collimated by a slow axis is basically a circular light spot, the second emitting diaphragm 9612 may be provided with a circular first light-passing hole.

The second mounting frame 972 may include a one-piece mounting frame or a split-type mounting frame. The second mounting frame 972 may include one or more second top plates 9721 and one or more second bottom plates 9722 corresponding to the second top plates 9721. The receiving channel 93 may be formed between one or more pairs of the second top plates 9721 and the first bottom plates 9722.

It should be noted that the first mounting frame 971 can use a one-piece mounting frame, so that the entire emitting optical path is arranged in the enclosed emitting channel 91, which may block the light and prevent the emergent laser from receiving by the laser receiving module 7 after being scattered or reflected, to form a leading light, leading to the formation of a near-field blind region after being received by the laser receiving module 7. The receiving optical path does not need to have light blocking treatment. The second mounting frame 972 may be arranged in sections, for example, the second mounting frame 972 may use the split-type mounting frame, which may simplify processing and reduce weight.

The receiving optical system 6 may include a plurality of receiving lenses. The receiving channel 93 may include a plurality of receiving lens positions for mounting the receiving lens. The limit block 95 may be arranged between adjacent receiving lens positions. The limit block 95 may be arranged in the upper and lower sides of the receiving channel 93. At least one receiving diaphragm 962 may be arranged in the receiving channel 93. The receiving diaphragm 962 may be arranged between the receiving lenses to reduce or eliminate stray light in the receiving optical path.

The plurality of receiving lenses of the receiving optical system 6 may include a focusing module 61 and a correcting module 62. At least a first receiving diaphragm 9621 and a second receiving diaphragm may be arranged in the receiving channel 93. The first receiving diaphragm 9621 may be arranged between the focusing module 61 and the correcting module 62. The first receiving diaphragm 9621 may be provided with a circular second light-passing hole. The second receiving diaphragm may be arranged between the correcting module 62 and the laser receiving module 7. The second receiving diaphragm may be also provided with a circular third light-passing hole. In this embodiment, the light outlet 15 shown in FIG. 8 may be the second receiving diaphragm. An optical filter 963 may be also arranged between the laser splitting module 5 and the focusing module 61 to filter out stray light in the non-working band, which has a good effect on eliminating natural light interference and other radar interference.

In some embodiments of the present disclosure, the third mounting frame 973 and the first mounting frame 971 may include a one-piece structure, so that the entire emitting optical path and a laser splitting optical path may be arranged in a closed channel. As a result, it may block the light and prevent the emergent laser from being scattered or reflected to form a leading light, and form a near-field blind region after being received by the laser receiving module 7. In addition, the emitting optical system 4 and the laser splitting module 5 may be compactly arranged, which is beneficial to reduce the height and width of the laser transceiving module 10, and reduce the volume and weight of a single laser transceiving module 10. In other embodiments, the third mounting frame 973 and the first mounting frame 971 may also be split-type structures.

As shown in FIGS. 6 and 7, in some embodiments, a mirror module 8 may be also arranged in the cavity 9. The mirror module 8 may be configured to reflect the echo laser deflected by the laser splitting module 5 and then shoot the echo laser toward the receiving optical system 6. The mirror module 8 may use a flat reflector, a cylindrical reflector, an aspherical curvature reflector, and the like. A fourth mounting frame 974 may be arranged in the cavity 9. A reflecting channel 94 may be arranged in the fourth mounting frame 974. The mirror module may be mounted in the reflecting channel 94. The light inlet of the reflecting channel 94 may be aligned with the third optical port of the laser splitting channel 92, and the light outlet of the reflecting channel 94 may be aligned with the light inlet of the receiving channel 93.

In some embodiments, the fourth mounting frame 974, the second mounting frame 972, and the third mounting frame 973 may include a one-piece structure to be mounted easily. In addition, the mirror module 8 may be compactly arranged with the laser splitting module 5 and the receiving module 7, which is beneficial to reduce the height and width of the laser transceiving module 10, and reduce the volume and weight of the single laser transceiving module 10. In other embodiments, the fourth mounting frame 974, the second mounting frame 972, and the third mounting frame 973 may also be split-type structures. In some embodiments, the first mounting frame 971, the second mounting frame 972, the third mounting frame 973, and the fourth mounting frame 974 may include a one-piece structure with the base body 11. Fixing structures of the first mounting frame 971 and the second mounting frame 972, the third mounting frame 973 and the fourth mounting frame 974 may be omitted, which is beneficial to reduce the height and width of the laser transceiving module 10, and to reduce the volume and weight of the single laser transceiving module 10.

In some embodiments, the optical filter 963 may be further arranged between the mirror module 8 and the receiving optical system 6. The optical filter 963 may be a narrow-band optical filter, such as a narrow-band optical filter of 905 nm or 1550 nm. The optical filter may be selected according to the wavelength of the emitted laser of the laser emitting module 3, which is mainly configured to filter interference light in a non-operating band, thereby having a good effect on eliminating natural light interference and other radar interference.

In the embodiment of the present disclosure, the laser transceiving module 10 of the single laser optical path may be arranged as one module. Laser optical paths of each laser transceiving module may be separated to avoid mutual influence. When the single laser transceiving module 10 fails, the failing module may be directly replaced, which is convenient for repair and replacement, has strong interchangeability, and is easy to mass produce. The assembly of structural components is different from a traditional top-to-bottom assembly method, but uses a side assembly method. Each optical component may be embedded in the cavity 9 from the side. A connection structure between the optical components is omitted, thereby reducing the height of the laser transceiving module 10, and the size and weight of the product. Considering that the emitting optical system 4, the laser splitting module 5 and the receiving optical system 6 may be directly embedded in the respective channels thereof, other fixing devices and fasteners may be not needed to fix the emitting optical system, the laser splitting module and the receiving optical system, thereby reducing the number of parts, saving costs, having a simpler assembly process, and shortening assembly time, improving assembly efficiency, being also beneficial to reduce the height and width of the laser transceiving module 10, and reducing the volume and weight of the single laser transceiving module 10.

The assembly of the forgoing laser transceiving module is described below. The laser transceiving module is pre-mounted and optically adjusted before the entire LiDAR is mounted.

Figure 9:
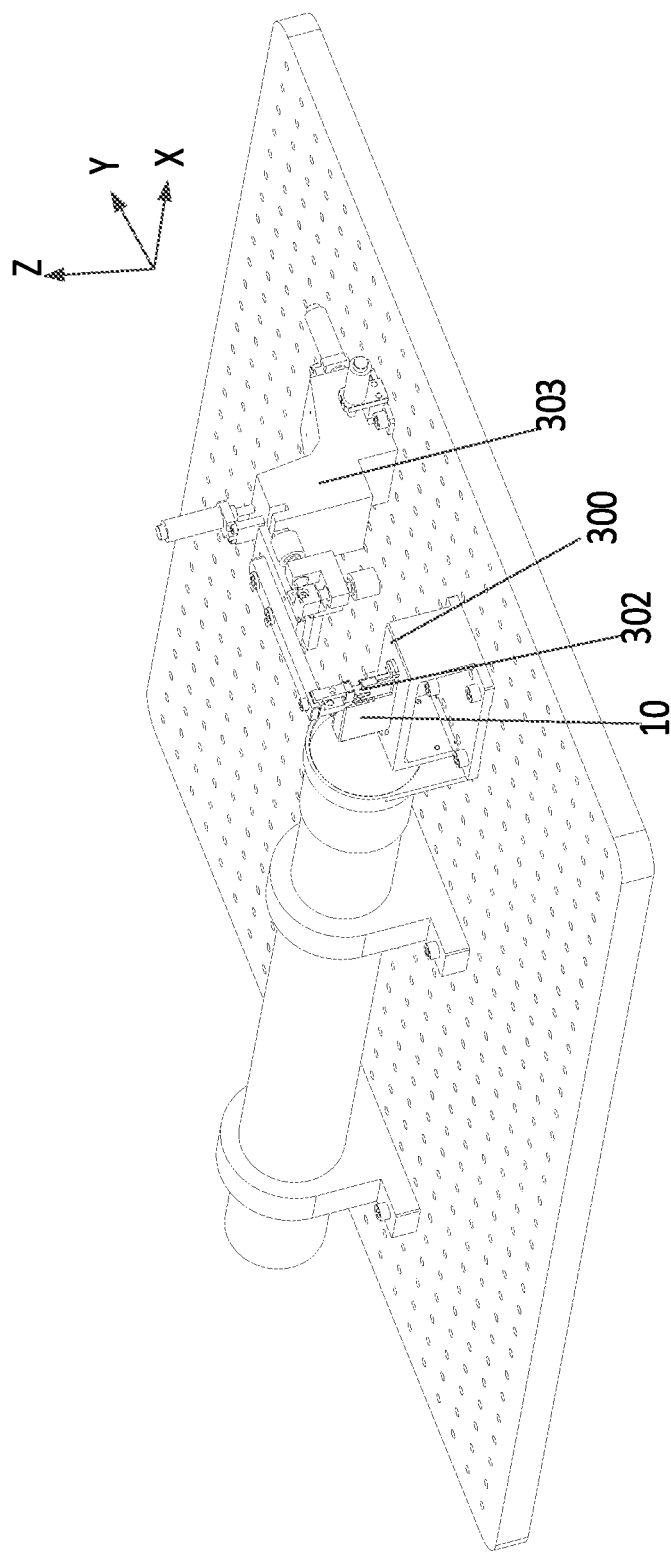
FIG. 9 shows a schematic diagram of a structure of an emitting light adjustment of a laser transceiving module provided by an embodiment of the present disclosure.
Figure 10:
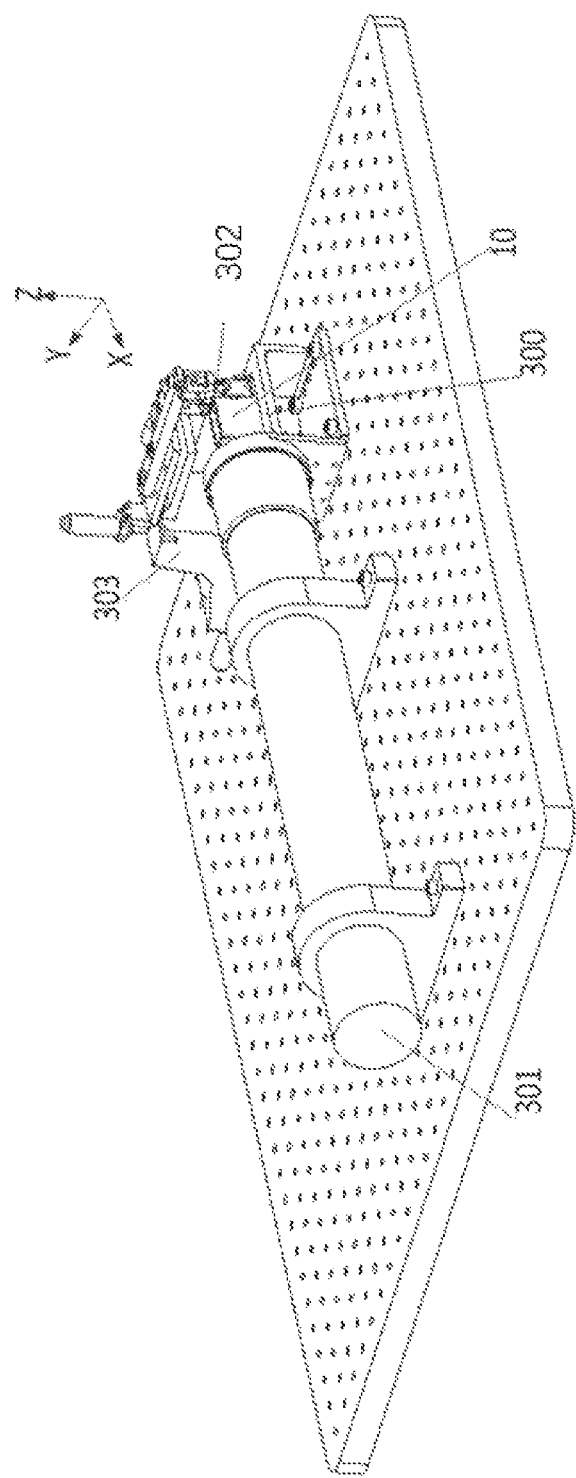
FIG. 10 shows a schematic diagram of a structure of an emitting light adjustment of a laser transceiving module, from another view angle, provided by an embodiment of the present disclosure.

Please refer to FIG. 9 and FIG. 10, an emitting light adjustment method of a laser transceiving module 10 may include the following steps:

Step 101: fixing an emitting optical system, a laser splitting module, and a receiving optical system in an emitting channel, a laser splitting channel, and a receiving channel respectively to obtain a pre-mounted module. In this step, an emitting lens, a receiving lens, a diaphragm, a laser splitting mirror, a reflecting mirror, etc. may be pre-mounted in the corresponding channel in the base, and then glued and fixed.

Step 102: fixing the pre-mounted module on an emitting light adjustment platform 300 and aligning the pre-mounted module with a parallel light plate 301.

Step 103: positioning a laser emitting module in the area of a base for fixing the laser emitting module. In this step, firstly, an emitting plate and a heat sink may be pre-assembled together with a screw to form an integral laser emitting module, and then the laser emitting module may be positioned on a fixing plate of the base. The emergent laser may be aligned with a light-entering hole on the base.

Step 104: clamping the laser emitting module with a tooling clamp 302 so that a laser emitting port of the laser emitting module is aligned with the light-entering hole of the base.

Step 105: adjusting the laser emitting module in an X-axis direction, a Y-axis direction, and a Z-axis direction via a 3D adjustment frame 303 until a light spot on the parallel light plate 301 meets preset requirements. In this step, the best form of the light spot may need to be adjusted. The position and contour of the best form of the light spot may be marked on the parallel light plate in advance. During an adjustment process, when an emergent laser is at this position and a shape matches, it is considered that the light spot reaches the best form and meets the preset requirements. A divergence angle may be calculated by measuring the size of the light spot of the collimated emergent laser. When the divergence angle is not greater than a preset divergence angle threshold, the light spot may be considered to be in the best form.

Regarding an adjustment sequence of an X-axis direction, a Y-axis direction and a Z-axis direction, it can adjust first along the emitting direction of the emergent laser, for example, the X-axis direction in FIG. 9 and FIG. 10, so that a light-emitting surface is positioned on the focal length of the collimating lens. At this time, three clear light spots may be provided on the parallel light plate (which is related to the device feature of the emitting plate, and the shape of the light spot may be different for different emitting plates). Then the position of the laser emitting module in this direction may be fixed and the other two directions may be adjusted. The adjustment of the other two directions has no specific sequence requirements and may be carried out arbitrarily, and finally the light spot may be positioned at a set position of the parallel light plate.

Step 106: fixing the laser emitting module on the base. In this step, the laser emitting module may be glued and fixed on the base.

At this point, the emitting light adjustment of the laser transceiving module 10 is completed.

Figure 11:
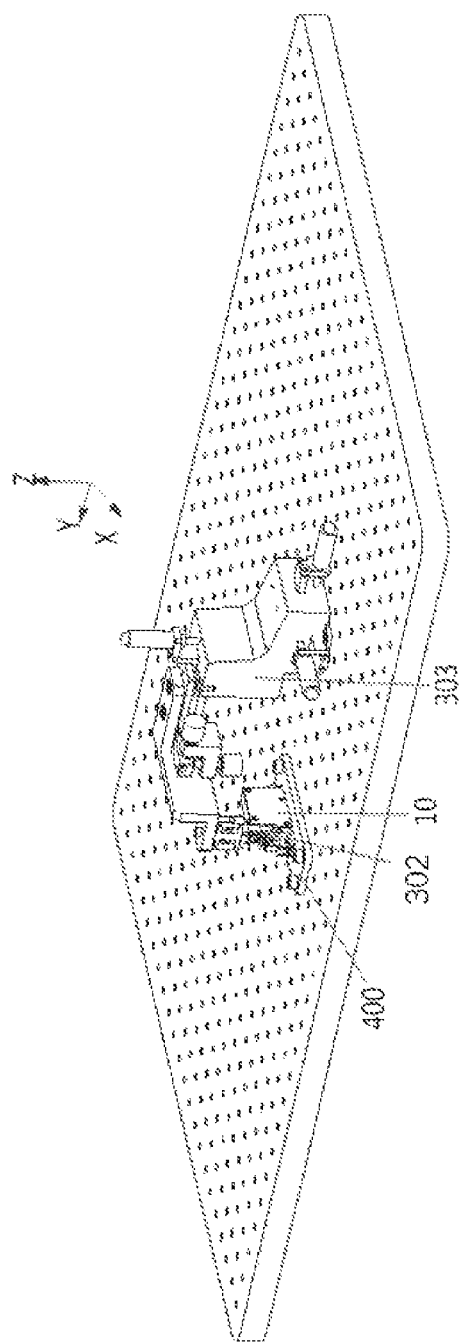
FIG. 11 shows a schematic diagram of a structure of a receiving light adjustment of a laser transceiving module provided by an embodiment of the present disclosure.

Please refer to FIG. 11, a receiving light adjustment method of a forgoing laser transceiving module 10 may include the following steps:

Step 201: fixing a base adjusted by an emitting light on a receiving light adjustment platform 400, where a laser emitting module, an emitting optical system, a laser splitting module, and a receiving optical system may be fixed on a base.

Step 202: clamping a laser receiving module with a tooling clamp 302 so that the laser receiving module contacts a light-emitting hole of the base.

Step 203: adjusting the laser receiving module in an X-axis direction and a Y-axis direction via a 3D adjustment frame 303 until echo laser signals meets preset requirements. In this step, it may be necessary to adjust to the optimal position for receiving the echo laser signals. Similar to emitting light adjustment, the order for the X-axis direction and the Y-axis direction may be also able to be adjusted along the optical axis direction of the echo laser, for example, the X-axis direction in the figure, so that the receiving light spot is positioned at a suitable position. The optimal position of the echo laser signals may be determined by the following methods: comparing the echo laser with a preset optical signal threshold; when an echo laser is lower than the preset optical signal threshold, adjusting the position of the laser receiving module; when the echo laser is greater than or equal to the preset optical signal threshold, it may be determined that the current position of the laser receiving module is the optimal position for receiving the echo laser signals.

Step 204: fixing the laser receiving module on the base.

At this point, the receiving light adjustment of the laser transceiving module 10 is completed.

In the entire light adjustment process of the laser transceiving module, only the laser emitting module and the laser receiving module need to be adjusted, thereby reducing light adjustment links, being easy to be operated, and improving light adjustment efficiency. The light of the single laser transceiving module is adjusted well before installation, and the modules do not affect each other.

Furthermore, based on a forgoing LiDAR 100, an embodiment of the present disclosure proposes an automatic drive apparatus 200, including the LiDAR 100 in the forgoing embodiment. The automatic drive apparatus 200 may be a car, an airplane, a boat, or other related apparatuses where the LiDAR is used for intelligent sensing and detection. The automatic drive apparatus 200 may include a drive apparatus body 201 and the LiDAR 100 in the forgoing embodiment. The LiDAR 100 is mounted on the drive apparatus body 201.

Figure 12:
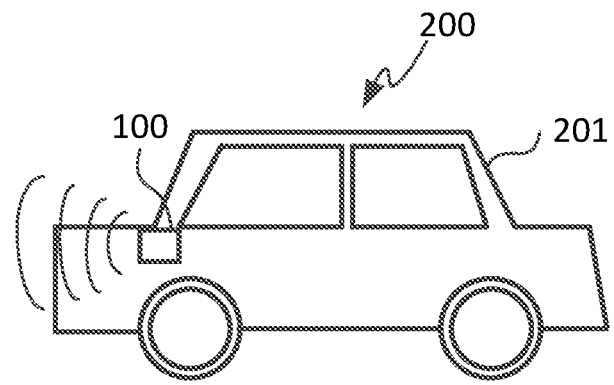
FIG. 12 shows a schematic diagram of a structure of an automatic drive apparatus provided by an embodiment of the present disclosure.
Figure 13:
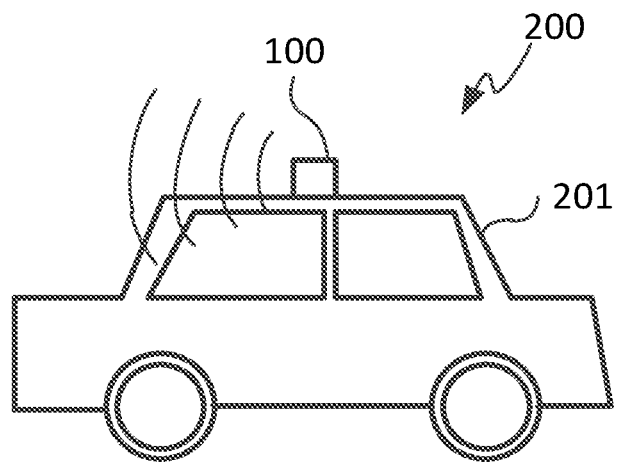
FIG. 13 shows a schematic diagram of a structure of an automatic drive apparatus provided by another embodiment of the present disclosure.

As shown in FIG. 12, the automatic drive apparatus 200 is an unmanned vehicle, and the LiDAR 100 may be mounted on the side of the vehicle body. As shown in FIG. 13, the automatic drive apparatus 200 may be also the unmanned car, and the LiDAR 100 may be mounted on the roof of a vehicle.

Finally, it should be noted that the foregoing embodiments are intended for describing instead of limiting the technical solutions of the present disclosure. Although the present disclosure is described in detail with reference to the foregoing embodiments, the person skilled in the art should understand that modifications may be made to the technical solutions described in the foregoing embodiments or equivalent replacements may be made to some or all technical features thereof, without departing from the scope of the technical solutions. All these modifications or replacements shall fall within the scope of the claims and specification of the present disclosure. Particularly, the technical features mentioned in all embodiments may be combined in any manner, provided that no structural conflict occurs. The present disclosure is not limited to the specific embodiments disclosed in this specification, but may include all technical solutions that fall within the scope of the claims.

What is claimed is:

1. A laser transceiving module, comprising a base, a side cover, a laser emitting module, an emitting optical system, a laser splitting module, a receiving optical system, and a laser receiving module, wherein:

the base comprises a base body, the base body and the side cover encircle to form a cavity, an emitting channel, a laser splitting channel, and a receiving channel for mounting the emitting optical system, the laser splitting module, and the receiving optical system respectively are arranged in the cavity;

the laser emitting module and the laser receiving module are arranged on the base and positioned outside the cavity; and the laser emitting module is configured to emit an emergent laser, the emitting optical system is configured to collimate the emergent laser, the laser splitting module is configured to enable the collimated emergent laser to pass through the laser splitting module and emit to a detection area, and enable an echo laser incident coaxially with the emergent laser to be deflected and direct to the receiving optical system, the receiving optical system is configured to converge the echo laser and enable the converged echo laser to direct to the laser receiving module, and the laser receiving module is configured to receive the echo laser;

a first mounting frame comprises a first top plate and a first bottom plate is arranged in the cavity, the emitting channel is formed between the first top plate and the first bottom plate, and the first mounting frame is a one-piece mounting frame;

the emitting optical system comprises a fast-axis collimating module and a slow-axis collimating module;

at least a first emitting diaphragm and a second emitting diaphragm are arranged in the emitting channel;

the first emitting diaphragm comprises at least one first emitting sub-diaphragm arranged between the fast-axis collimating module and the slow-axis collimating module in sequence, each of the at least one first emitting sub-diaphragm comprises a light blocking part correspondingly arranged on a lower side of the first top plate and an upper side of the first bottom plate; and the second emitting diaphragm is arranged between the slow axis collimating module and the laser splitting module, and the second emitting diaphragm is provided with a circular first light-passing hole.

2. The laser transceiving module according to claim 1, wherein a second mounting frame and a third mounting frame are arranged in the cavity, the emitting channel is arranged in the first mounting frame, the receiving channel is arranged in the second mounting frame, the laser splitting channel is arranged in the third mounting frame, the laser splitting channel comprises a first optical port, a second optical port, and a third optical port, the first optical port is aligned with a light outlet of the emitting channel, and the third optical port is aligned with a light inlet of the receiving channel.

3. The laser transceiving module according to claim 2, wherein the first mounting frame comprises a one-piece mounting frame, and the second mounting frame comprises a one-piece mounting frame or a split-type mounting frame.

4. The laser transceiving module according to claim 2, wherein the second mounting frame comprises at least one second top plate and at least one second bottom plate corresponding to the at least one second top plate, and the receiving channel is formed between at least one pair of the second top plate and the second bottom plate.

5. The laser transceiving module according to claim 4, wherein the receiving optical system comprises a focusing module and a correcting module and comprises a plurality of receiving lenses, the receiving channel comprises a plurality of receiving lens positions for mounting the receiving lens, one or more limit blocks are arranged between adjacent ones of the plurality of receiving lens positions, and the one or more limit blocks are arranged on the upper and lower sides of the receiving channel.

6. The laser transceiving module according to claim 5, wherein:

at least a first receiving diaphragm and a second receiving diaphragm are arranged in the receiving channel;

the first receiving diaphragm is arranged between the focusing module and the correcting module, and the first receiving diaphragm is provided with a circular second light-passing hole; and the second receiving diaphragm is arranged between the correcting module and the laser receiving module, and the second receiving diaphragm is provided with a circular third light-passing hole.

7. The laser transceiving module according to claim 2, wherein each of the third mounting frame and the first mounting frame comprises a one-piece structure.

8. The laser transceiving module according to claim 2, wherein a mirror module is further arranged in the cavity, the mirror module is configured to reflect the echo laser deflected by the laser splitting module and shoot the echo laser toward the receiving optical system, a fourth mounting frame is arranged in the cavity, a reflecting channel is arranged in the fourth mounting frame, the mirror module is mounted in the reflecting channel, a light inlet of the reflecting channel is aligned with the laser splitting channel of the third optical port, and a light outlet of the reflecting channel is aligned with the light inlet of the receiving channel.

9. The laser transceiving module according to claim 8, wherein each of the fourth mounting frame, the second mounting frame, and the third mounting frame comprises a one-piece structure.

10. The laser transceiving module according to claim 1, wherein the emitting optical system comprises a plurality of emitting lenses, the emitting channel comprises a plurality of emitting lens positions for mounting the emitting lenses, a limit block is arranged between adjacent ones of the plurality of emitting lens positions, and the limit block is arranged inside the emitting channel and positioned at upper and lower sides of the emitting channel.

11. The laser transceiving module according to claim 1, wherein a bottom of the first bottom plate is opened and provided with a weight reduction groove.

12. The laser transceiving module according to claim 1, wherein the base further comprises a fixing plate extending from one side of the base body, the laser emitting module is arranged on the fixing plate, and the laser receiving module is arranged on an outer side wall of the base body.

13. The laser transceiving module according to claim 1, wherein the emitting optical system, the laser splitting module, and the receiving optical system are fixed in the emitting channel, the laser splitting channel, and the receiving channel via an adhesive, respectively.

14. A LiDAR, comprising at least a laser transceiving module, wherein the laser transceiving module comprises a base, a side cover, a laser emitting module, an emitting optical system, a laser splitting module, a receiving optical system, and a laser receiving module, wherein:

the base comprises a base body, the base body and the side cover encircle to form a cavity, the emitting optical system, the laser splitting module, and the receiving optical system are arranged in the cavity, an emitting channel, a laser splitting channel, and a receiving channel for mounting the emitting optical system, the laser splitting module, and the receiving optical system respectively are arranged in the cavity;

the laser emitting module and the laser receiving module are arranged on the base and positioned outside the cavity; and the laser emitting module is configured to emit an emergent laser, the emitting optical system is configured to collimate the emergent laser, the laser splitting module is configured to enable the collimated emergent laser to pass through the laser splitting module and emit to a detection area, and enable an echo laser incident coaxially with the emergent laser to be deflected and direct to the receiving optical system, the receiving optical system is configured to converge the echo laser and enable the converged echo laser to direct to the laser receiving module, and the laser receiving module is configured to receive the echo laser;

a first mounting frame comprises a first top plate and a first bottom plate is arranged in the cavity, the emitting channel is formed between the first top plate and the first bottom plate, and the first mounting frame is a one-piece mounting frame;

the emitting optical system comprises a fast-axis collimating module and a slow-axis collimating module;

at least a first emitting diaphragm and a second emitting diaphragm are arranged in the emitting channel;

the first emitting diaphragm comprises at least one first emitting sub-diaphragm arranged between the fast-axis collimating module and the slow-axis collimating module in sequence, each of the at least one first emitting sub-diaphragm comprises a light blocking part correspondingly arranged on a lower side of the first top plate and an upper side of the first bottom plate; and the second emitting diaphragm is arranged between the slow axis collimating module and the laser splitting module, and the second emitting diaphragm is provided with a circular first light-passing hole.

15. A method for emitting light adjustment of a laser transceiving module, wherein the laser transceiving module comprises a base, a side cover, a laser emitting module, an emitting optical system, a laser splitting module, a receiving optical system, and a laser receiving module, the method comprising:

arranging a first mounting frame comprising a first top plate and a first bottom plate in a cavity formed by the base and the side cover, such that an emitting channel is formed between the first top plate and the first bottom plate, the first mounting frame being a one-piece mounting frame;

arranging the emitting optical system to comprise a fast-axis collimating module and a slow-axis collimating module in sequence within the emitting channel;

arranging at least a first emitting diaphragm and a second emitting diaphragm in the emitting channel;

arranging the first emitting diaphragm to comprise at least one first emitting sub-diaphragm between the fast-axis collimating module and the slow-axis collimating module, wherein each first emitting sub-diaphragm comprises a light blocking part correspondingly arranged on a lower side of the first top plate and an upper side of the first bottom plate;

arranging the second emitting diaphragm between the slow-axis collimating module and the laser splitting module, the second emitting diaphragm being provided with a circular first light-passing hole;

fixing the emitting optical system, the laser splitting module, and the receiving optical system in an emitting channel, a laser splitting channel, and a receiving channel respectively to obtain a pre-mounted module;

fixing the pre-mounted module on an emitting light adjustment platform and aligning the pre-mounted module with a parallel light plate;

positioning the laser emitting module in an area of the base for fixing the laser emitting module;

clamping the laser emitting module with a tooling clamp, a laser emitting port of the laser emitting module being aligned with a light-entering hole of the base;

adjusting the laser emitting module along an X-axis direction, a Y-axis direction, and a Z-axis direction via a 3D adjustment frame until a light spot on the parallel light plate meets preset requirements; and fixing the laser emitting module on the base.

* * * * *